Jan. 24, 1961 M. J. STEFFES 2,969,122

HOLLOW DRILL

Original Filed March 31, 1955

INVENTOR.
Milton J. Steffes.
BY
Harness, Dickey & Pierce
ATTORNEYS.

United States Patent Office 2,969,122
Patented Jan. 24, 1961

2,969,122
HOLLOW DRILL

Milton J. Steffes, Dearborn, Mich., assignor to Van Norman Industries, Inc., Springfield, Mass., a corporation of Massachusetts Original application Mar. 31, 1955, Ser. No. 498,154, now Patent No. 2,919,902, dated Jan. 5, 1960. Divided and this application Jan. 14, 1957, Ser. No. 633,963

3 Claims. (Cl. 175—394)

This application is a division of applicant's copending application Serial No. 498,154 filed March 31, 1955, now Patent Number 2,919,902.

The present invention relates to drills and particularly to a masonry drill of tubular construction having angularly disposed slots on opposite sides of the wall thereof and hardened teeth at one end thereof.

The masonry drill of the present invention embodies a tubular body having angularly disposed slots on opposite sides of the body and hardened teeth mounted on the cutting end of the tool in a manner which produces long life and rapid cutting. The angularly disposed slots on the body communicate the space within the hollow interior of the body with the space surrounding the exterior of the body. Consequently, cuttings produced by the teeth pass from the interior of the body outwardly thereof and are carried upwardly on the sloping surfaces of the slots away from the cutting teeth. The tubular body also has a sleeve welded thereto at the top containing an internal thread to which a shank having a threaded end is secured and locked by a nut on the thread.

In operation, the drill cuts an annular aperture leaving a central core. The cuttings produced by the teeth pass upwardly between the walls of the aperture and the smooth surfaces of the tubular body aided by the slots which keep the cuttings moving. The cuttings cannot pack about the cutting teeth of the drill because the cuttings resting in the slots are carried upwardly by the rotation of the tubular body and carry the cuttings on either side thereof along with them. The greater the tendency of the cuttings to pack, the more effective the lifting action of the slots becomes. An additional pair of cutting teeth are employed which extend radially inwardly a greater distance than the remaining cutting teeth for cutting the outer surface of the core while the aperture is being drilled. This reduces the diameter of the core and provides greater clearance for removal of cuttings and permits the core to be readily broken from the bottom of the drill aperture.

Accordingly, the main objects of the invention are: to provide a fast cutting masonry drill; to provide a masonry drill which rapidly removes the cuttings so that they will not interfere with the cutting action of the drill; to provide a masonry drill which produces rapid cutting by causing the cuttings to be raised from the aperture away from the cutting teeth during the cutting operation; to provide a masonry drill which cuts an annular aperture having a reduced core therein, and, in general, to provide a masonry drill which is simple in construction, positive in operation and economical to manufacture.

Other objects and features of novelty of the invention will become apparent when referring, for a better understanding of the invention, to the following description taken in conjunction with the accompanying drawings, wherein.

Figure 1:
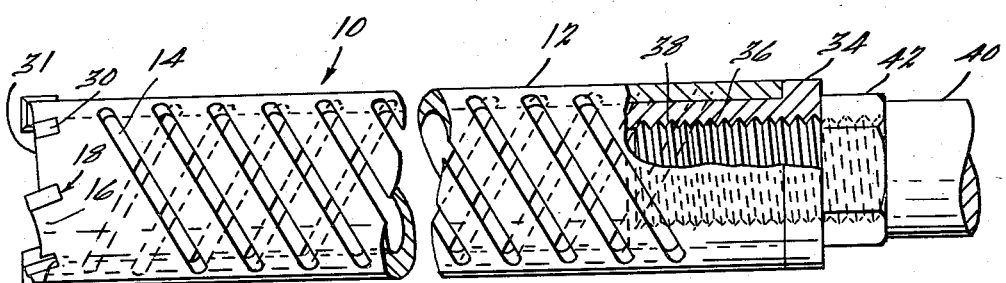
Figure 1 is a view in elevation with a portion thereof broken away of a masonry drill embodying features of the present invention.
Figure 2:
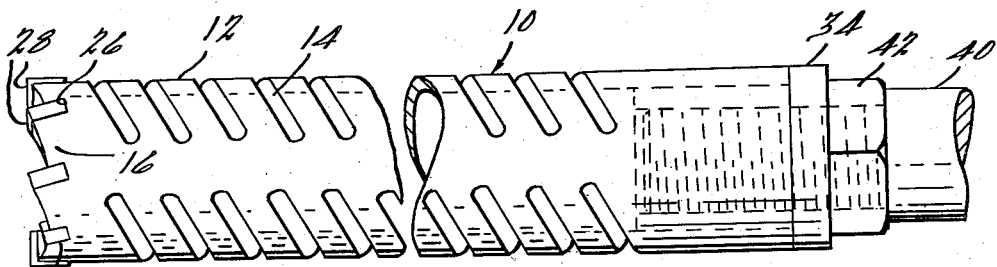
Fig. 2 is a side view in elevation of the masonry drill of Fig. 1.
Figure 3:
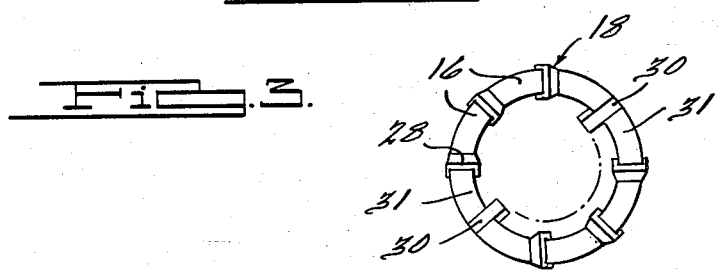
Fig. 3 is an end view of the cutting end of the structure illustrated in Fig. 1.

Referring particularly to Figs. 1, 2 and 3, the masonry drill 10 of the present invention comprises a smooth walled, hollow body 12 of tubular construction having slots 14 cut at an angle on opposite sides thereof. The cutting end of the tool is machined to have six sloping tooth supporting extensions 16 against which teeth 18 are secured by suitable means, such as by brazing. The teeth 18 are made of hard metal such as tungsten carbide, or the like, to provide long life.

Figure 4:
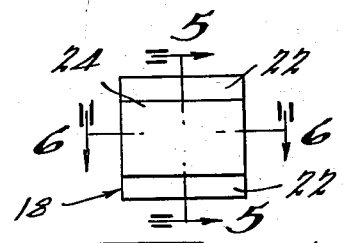
Fig. 4 is a view in elevation of a tooth employed in the masonry drill embodying features of the present invention.
Figure 5:
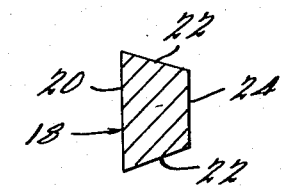
Fig. 5 is a vertical sectional view of the structure illustrated in Fig. 4 taken on the line 5—5 thereof.
Figure 6:
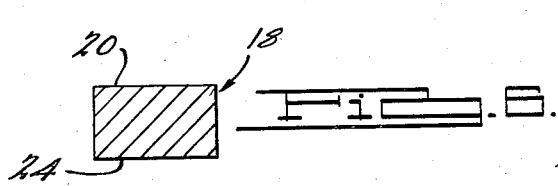
Fig. 6 is a horizontal sectional view of the structure illustrated in Fig. 5 taken on the line 6—6.

As best illustrated in Figs. 4, 5 and 6, the teeth 18 are of trapezoidal configuration and have a cutting face 20, sloping sides 22 and a smaller face 24. Six angularly disposed grooves 26 are provided in the end of the body 12 to cooperate with the sloping extension 16 in a manner to permit the teeth 18 to be secured to the sloping surfaces of the supporting extensions 16 in a tilted fashion so that the bottom cutting edges 28 are relieved rearwardly. In this manner the trapezoidal shape of the teeth 18 provides relief to the side edges thereof rearwardly of the face 20, while the tilting of the teeth produces relief to the bottom cutting edges 28 thereof. Large areas are provided between the teeth so that the cuttings formed on each tooth will not clog or interfere with the operation of the next adjacent tooth.

Two additional teeth 30 are diametrically disposed on the cutting end of the body 12 and are secured to two supporting extensions 31 by suitable means, such as by brazing. The teeth 30 extend radially inward a greater distance than the teeth 18 for cutting the outer surface of the core while the aperture is being drilled. This reduces the diameter of the core and provides greater clearance for removal of cuttings and permits the core to be readily broken from the bottom of the drilled aperture. The cuttings of the teeth 18 and 30 will be urged into the hollow interior of the drill body 12 and will pass outwardly through the slots 14 and be carried upwardly on the sloping surfaces of the slots 14 away from the cutting end of the body as previously described. This prevents the cuttings from packing in the bottom of the hole being drilled and permits continued rapid cutting by the teeth. The opposite end of the body 12 contains a shouldered sleeve 34 which is welded or otherwise secured therein and which is provided with an internal thread 36. Threaded end 38 of a shank 40 is screwed into the thread 36 of the sleeve 34 and is locked therein by a nut 42 on the thread 38.

The trapezoidal teeth disposed at an angle produce the fast cutting which is desirable. Further, the cooperation of the trapezoidal shaped teeth 18, the six angularly disposed grooves 26 and the six sloping extensions 16 provides a simple and inexpensive manner for securing the teeth 18 to the cutting end of the body 12 with appropriate relief necessary for cutting.

The masonry drill of the present invention is particularly suited for drilling larger diameter holes, as is evident from the number of teeth on the cutting end because it is less expensive yet equally as effective and rugged as other masonry drills. Using a masonry drill with spiral threads for larger diameter holes requires a tubular body having a greater wall thickness in order to permit the spiral threads to be machined thereon. By using the angular slot construction of the present invention, the expensive machining operation required to produce spiral threads is replaced with a more simple, less expensive, slotting operation and, in addition, a thinner walled tubular body may be used to further reduce the cost.

What is claimed is:

1. A masonry drill having a body of tubular construction with angularly disposed slots formed therein for carrying cuttings in an upward direction, the end of said tubular body having a plurality of spaced grooves disposed at an angle to provide supporting surfaces sloping in a direction opposite to the direction of rotation of the drill, and trapezoidal shaped teeth having a right-angle top end, said teeth being disposed in said spaced grooves and resting against said sloping supporting surfaces in a manner to have the wider presenting face relieved at the sides and a right angle top end relieved by tilting the teeth in a direction opposite to the direction of rotation of the drill, the opposite end of said body having a shank thereon.

2. A masonry drill having a body of tubular construction with angularly disposed slots formed therein for carrying cuttings in an upward direction, the end of said tubular body containing spaced sloping surfaces tilting rearwardly in a direction opposite to the direction of rotation of the drill, teeth of trapezoidal shape each having a wide and narrow face joined by sloping side faces and a top face at right angles thereto, the narrow faces being secured to said spaced sloping surfaces, the wider faces having the side and bottom edges relieved by the sloping side faces and the right angle top face being relieved by the sloping disposition of the teeth and a shank on the opposite end of the body from that containing said teeth.

3. A masonry drill having a body of tubular construction with means thereon for carrying cuttings in an upward direction, the end of said tubular body containing spaced supporting surfaces sloping rearwardly in a direction opposite to the direction of rotation of the drill, teeth of trapezoidal shape each having a wide and narrow face joined by sloping side faces and a top face at right angles thereto, the narrow faces being secured to said spaced sloping surfaces, the wider faces having the side edges relieved by the sloping side faces and the right angle top face relieved by the sloping disposition of the supporting surfaces, and a shank on the opposite end of the body from that containing said teeth.

References Cited in the file of this patent

UNITED STATES PATENTS

| | | |
|---|---|---|
| 483,210 | Corrigan | Sept. 27, 1892 |
| 632,764 | Stephens | Sept. 12, 1899 |
| 799,880 | Tonge | Sept. 19, 1905 |
| 1,209,058 | Smith | Dec. 19, 1916 |
| 1,271,396 | Walker | July 2, 1918 |
| 1,846,177 | Bascom et al. | July 16, 1928 |
| 2,506,474 | Tilden | May 2, 1950 |
| 2,524,570 | Phipps | Oct. 3, 1950 |